(12) United States Patent
Scott (10) Patent No.: US 6,407,348 B1
(45) Date of Patent: Jun. 18, 2002

(54) BAGGAGE BRIDGE APPARATUS

(76) Inventor: William M. Scott, P.O. Box 988, Ft Worth, TX (US) 76101

( * ) Notice: Subject to any disclaimer, the term of this patent is extended or adjusted under 35 U.S.C. 154(b) by 56 days.

(21) Appl. No.: 09/662,421

(22) Filed: Sep. 14, 2000

(51) Int. Cl.[7] .................. G01G 19/00; B65G 47/04; B65G 15/00
(52) U.S. Cl. ............... 177/145; 198/535; 193/35 R; 186/59; 14/70; 14/71.3; 14/72.5
(58) Field of Search .......... 14/70, 71.1, 71.2, 14/71.3, 71.5, 71.7, 72.5; 193/35 R; 198/583, 584, 632, 535, 370.09, 538; 186/59; 177/145

(56) References Cited

U.S. PATENT DOCUMENTS

| | | | |
|---|---|---|---|
| 479,533 A | 7/1892 | Schultz | 14/71.1 |
| 1,380,691 A * | 6/1921 | Tuohy | 198/583 |
| 2,449,829 A | 9/1948 | Agren | 14/69.5 |
| 2,590,359 A * | 3/1952 | Zopf | 198/632 |
| 2,759,207 A | 8/1956 | Pennington | 14/69.5 |
| 2,904,196 A * | 9/1959 | Teixeira | 193/35 R |
| 3,009,183 A | 11/1961 | Lay | 14/69.5 |
| 3,122,764 A | 3/1964 | Ambli | 14/71.3 |
| 3,220,527 A * | 11/1965 | Curtis | 193/35 R |
| 3,766,585 A | 10/1973 | Yoon | 14/69.5 |
| 3,928,882 A | 12/1975 | Miland | 14/69.5 |
| 4,182,433 A | 1/1980 | Foster | 186/68 |
| 4,265,336 A * | 5/1981 | Foster | 198/632 |
| 4,392,553 A * | 7/1983 | Foster | 186/68 |
| 4,508,209 A | 4/1985 | Whitman | 198/583 |
| 4,517,698 A * | 5/1985 | Lamp'l et al. | 14/72.5 |
| 4,864,672 A | 9/1989 | Altieri et al. | 14/69.5 |
| 5,001,799 A | 3/1991 | Alexander et al. | 14/71.1 |
| 5,353,903 A * | 10/1994 | Kechel et al. | 198/535 |
| 5,374,154 A * | 12/1994 | Alten | 14/71.1 |
| 5,456,348 A * | 10/1995 | Whetsel et al. | 198/812 |
| 5,600,859 A | 2/1997 | Hodges et al. | 14/71.1 |
| 5,862,884 A | 1/1999 | Smith | 14/69.5 |
| 5,944,169 A * | 8/1999 | Allen | 198/812 |
| 5,951,228 A * | 9/1999 | Pfeiffer et al. | 193/35 R |
| 6,102,185 A * | 8/2000 | Neuwirth et al. | 193/35 R |

FOREIGN PATENT DOCUMENTS

| | | | | |
|---|---|---|---|---|
| GB | 2257407 A | * | 1/1993 | 14/71.7 |
| JP | 3128822 | * | 5/1991 | 14/71.7 |

* cited by examiner

*Primary Examiner*—Randy W. Gibson
(74) *Attorney, Agent, or Firm*—Arthur F. Zobal (57) ABSTRACT

The apparatus is employed for moving baggage from a scale to a conveyor system. A support member with upper rollers is supported on the scale. Also provided is a bridge base and a bridge having one end pivotally coupled to the forward end of the bridge base. Both the bridge base and bridge have upper rollers. The bridge may be moved to an upward extending position when not in use and to a lower position extending to and supported by the conveyor system such that bags may be placed on the support member, weighed, and then moved by way of the rollers of the support member, the bridge base and the bridge to the conveyor system. In one embodiment, a biasing means is provided for urging the bridge to its upward extending position. A releasable latch is provided for securing the bridge in its lower position. When the latch is released, the biasing means moves the bridge to its upward extending position. In another embodiment the support member, the bridge base and the bridge each may have endless belts for conveying baggage to the conveyor system. In still another embodiment, gears and an actuator are employed to move the bridge between its upward extending position and its lower position.

20 Claims, 7 Drawing Sheets

BAGGAGE BRIDGE APPARATUS

BACKGROUND OF THE INVENTION

1. Field of the Invention

The invention relates to an apparatus for loading baggage from a scale to a conveyor system in an airport.

2. Description of the Prior Art

In the past, at airports, bags have been loaded manually from scales to a conveyor system behind the counter and scales. This has resulted in numerous injuries to the personnel over the years due in part to the weight of the bags.

SUMMARY OF THE INVENTION

It is an object of the invention to provide a new and useful baggage handling system for moving bags from a scale to the conveyor system.

The system comprises a support means with rotatable means to be supported on the scales to enable the bags to be placed on the support means and weighed. Also provided is a bridge base or bridge support having one end located next to the support means and a bridge having one end pivotally coupled to the other end of the bridge support. The top sides of the bridge support and the bridge have rotatable means coupled thereto. The bridge may be moved to an upward extending position when not in use and to a lower position extending to and supported by the conveyor system such that bags may be placed on the support means, weighted and then moved to the conveyor system by way of the rotatable means of the support means, the bridge support and the bridge.

In one embodiment, a biasing means is provided for urging the bridge to the upper extending position. A releasable latch is provided for securing the bridge in its lower loading position. When the latch is released, the biasing means moves the bridge to its upward extending position.

In another embodiment, gears and an actuator are employed to move the bridge between its upward extending position and its lower position.

DESCRIPTION OF THE PREFERRED EMBODIMENTS

Figure 1:
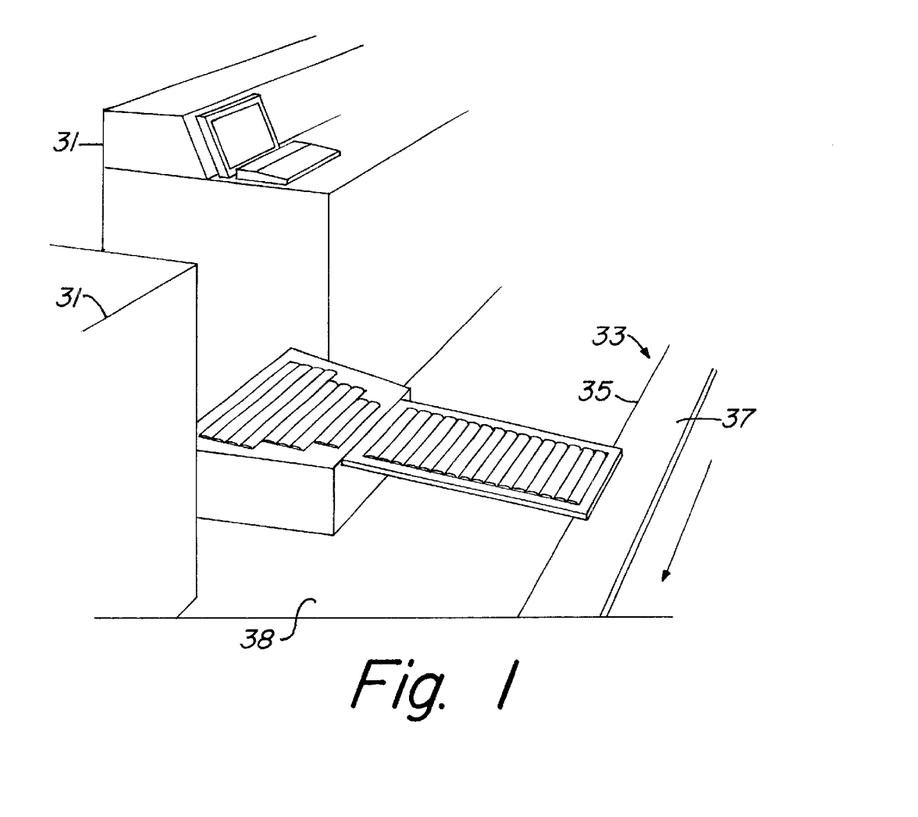
FIG. 1 illustrates the apparatus of the invention with the bridge extended to a conveyor system for use for loading bags from a scale to the conveyor system.
Figure 2:
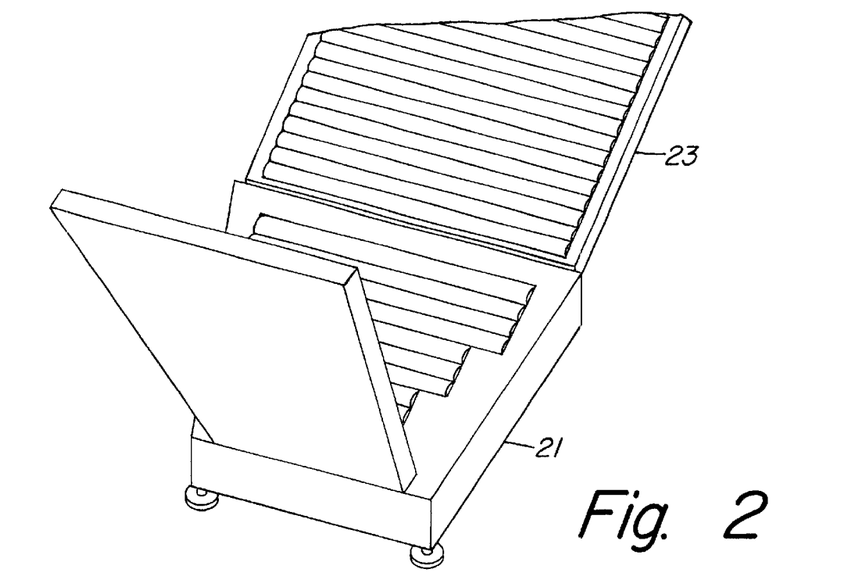
FIG. 2 illustrates the bridge located in an upward extending position when not in use.
Figure 3:
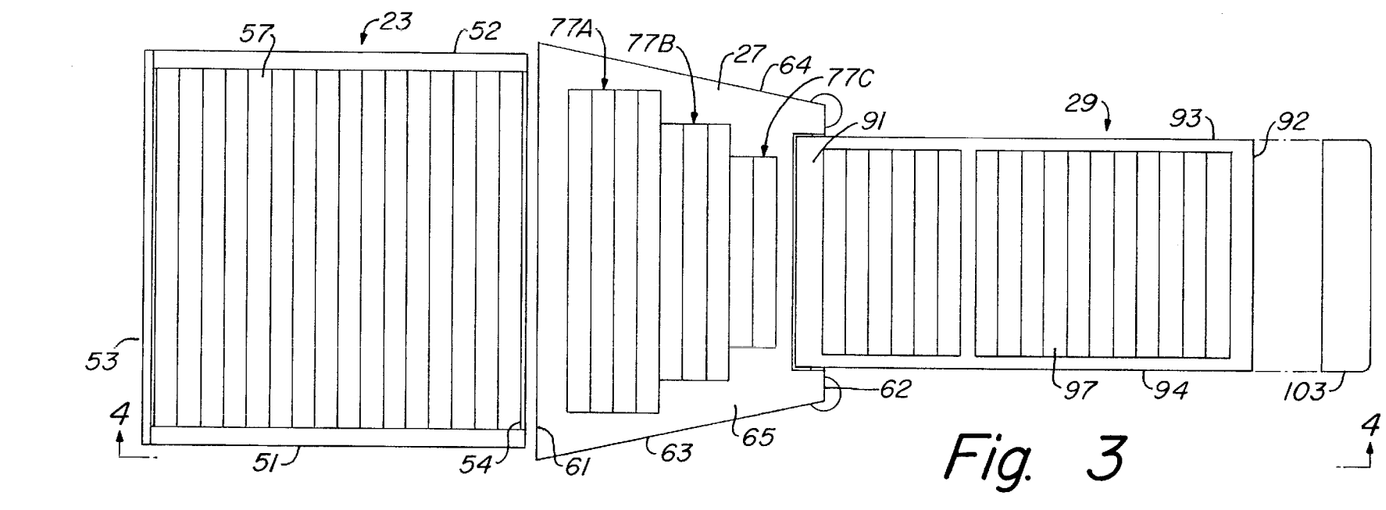
FIG. 3 is a top plan view of the apparatus with the bridge in a lowered position.
Figure 4:
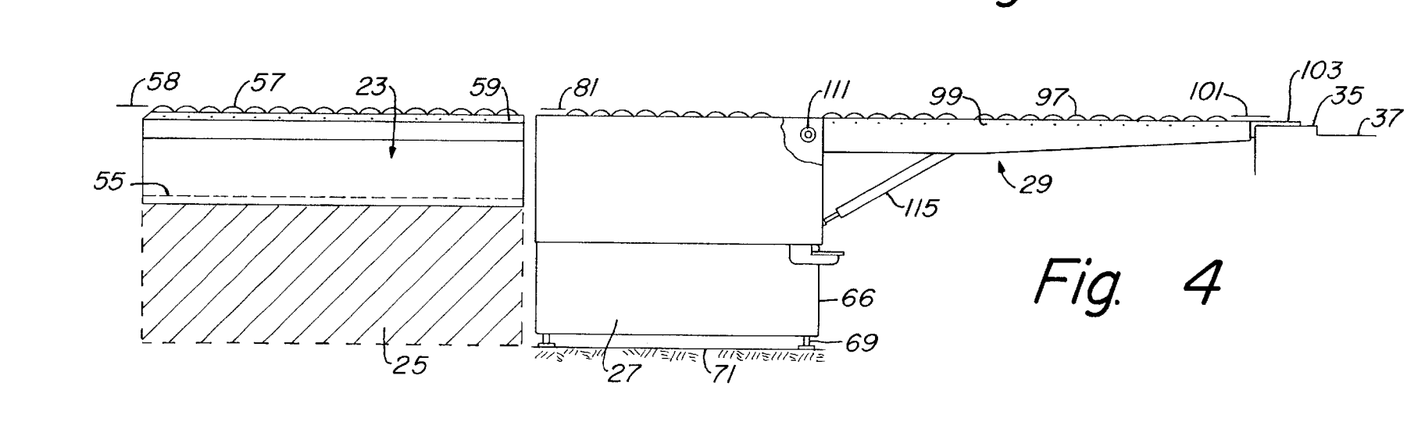
FIG. 4 is a side view of FIG. 3 as seen along lines 4—4 thereof and with the free end of the bridge supported by the top edge of a conveyor system.
Figure 5:
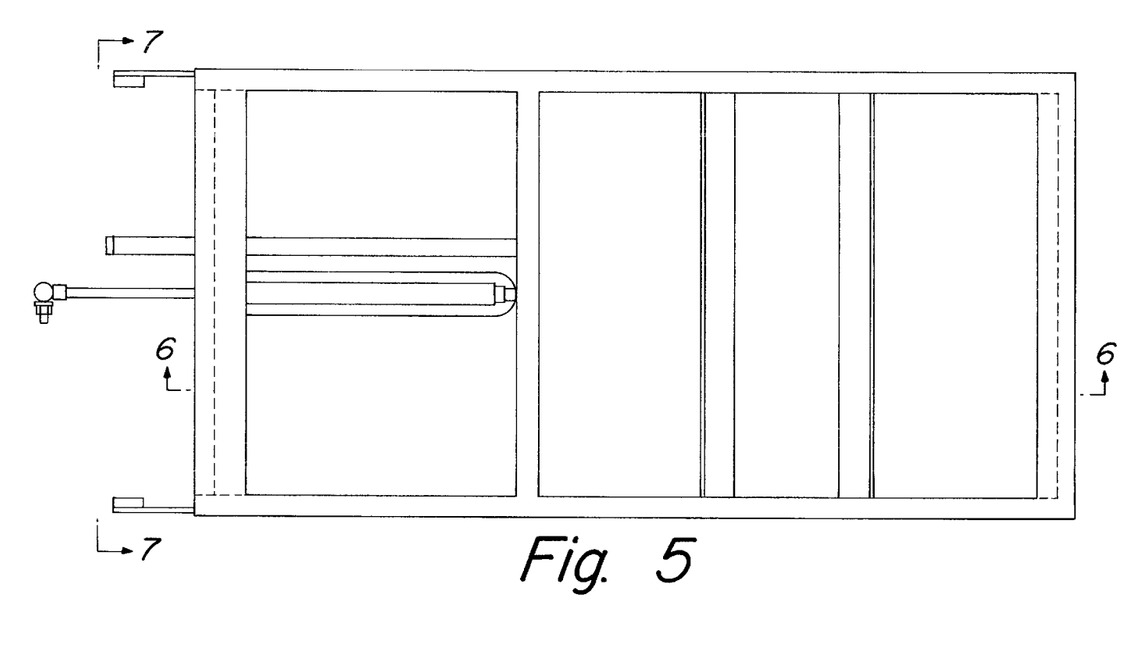
FIG. 5 is a top plan view of the bridge base and the bridge of the apparatus of FIGS. 1–4 with their rollers removed.
Figure 6:
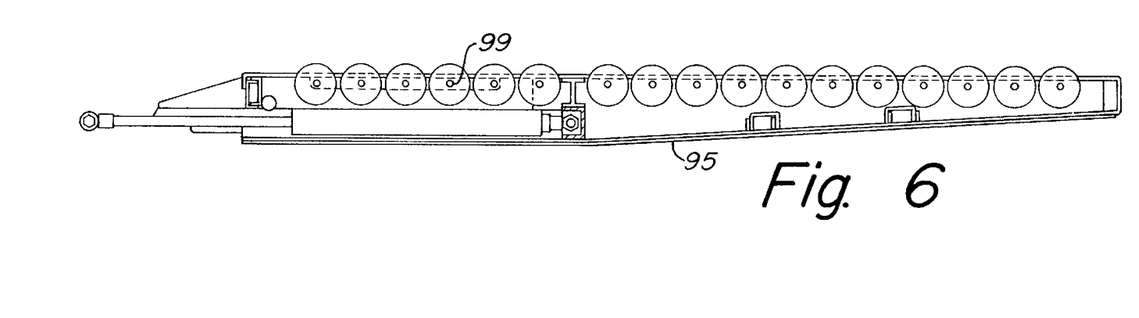
FIG. 6 is a side view of FIG. 5 as seen along lines 6—6 thereof.
Figure 7:
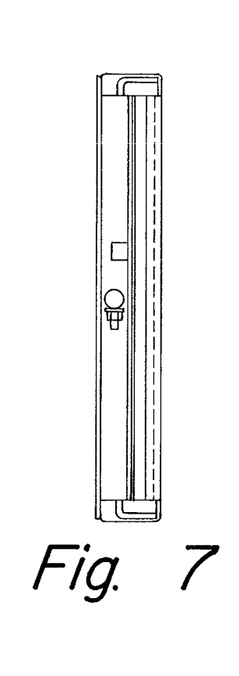
FIG. 7 is an end view of FIG. 5 as seen along lines 7—7 thereof.

Referring now to FIGS. 1–12, the apparatus of the invention is identified at 21 and comprises a roller tray assembly or roller support 23 adapted to be supported by a scale 25 and a bridge base or support 27 for pivotally supporting a bridge 29. As shown in FIGS. 1 and 4, the scale 25 is a conventional scale located between counters 31 in an airport used for weighing baggage which is checked and placed on a conveyor system 33 for transporting the baggage to facilities for loading onto an airplane. The conveyor system 33 comprise support structure 35 which supports a movable conveyor belt or device 37 located behind the counters 31 and aisle or walkway 38 used by airline personnel attendants. In the past, the attendants would manually lift the baggage from the scale and place it on the conveyor system 33.

Referring to FIGS. 3 and 4, the roller tray 23 comprises two side walls 51 and 52, and two end walls 53 and 54, and a bottom 55 with the side walls 51 and 52 supporting a plurality of cylindrical rollers 57 for rotation about their axes 59. The top of the rollers 57 are located in a plane 58. The rollers 57 may freely rotate clockwise or counter-clockwise about their axes as seen in FIG. 4. The rollers support baggage placed thereon for weighing purpose and then allow the baggage to be moved toward the end 54 onto the bridge base 27. By adjusting the scale 25 to compensate for the weight of the roller tray, a direct reading of the baggage weight can be obtained. As the baggage moves toward the bridge base 27, the rollers 57 will rotate clockwise about their axes as seen in FIG. 4.

The bridge base 27 is separate from the tray 33 and is trapezoidal in shape as seen from the top. It comprises two ends 61 and 62, two sides 63 and 64, a top wall 65 and a bottom structure 66 which has legs 69 for supporting the structure on the floor 71 such that the end 61 is located close to the end 54 of the tray 23. Sidewall structure is provided for supporting a plurality of cylindrical rollers 77A, 77B, 77C for rotation about their axes 79. The lengths of the rollers 77A, 77B, and 77C progressively decrease in steps from near end 61 toward end 62. The tops of the rollers 77A, 77B, 77C are located in a plane 81. The legs 69 are adjustable such that the plane 81 is in the same plane as plane 58. The rollers 77A, 77B, 77C may freely rotate clockwise or counter-clockwise about their axes 79 as seen in FIG. 4. The rollers 77A, 77B, 77C support baggage rolled thereon from tray rollers 57 for movement onto the bridge 29 when it is in a horizontal position.

The bridge 29 has two ends 91 and 92, two side walls 93 and 94 and a bottom wall 95. A plurality of cylindrical rollers 97 are supported by the side walls 93 and 94 for rotation about their axes 99. The tops of the rollers 97 are located in a plane 101 which is about in the same plane as plane 81 when the bridge 29 is in a lowered position as seen in FIG. 4. The rollers 97 may freely rotate clockwise or counter clockwise about their axes as seen in FIG. 4. The rollers 97 support baggage rolled thereon from rollers 77A, 77B, 77C for movement onto the conveyor device 37 when the bridge 29 is located in its lowered position with its end 92 against or next to the top edge structure 35 of the conveyor system 33. The end 92 has an L shaped strip 103 secured thereto for engaging the conveyor system side wall or edge 35 when the bridge 29 is in its lowered position as seen in FIG. 4.

Figures 8, 9:
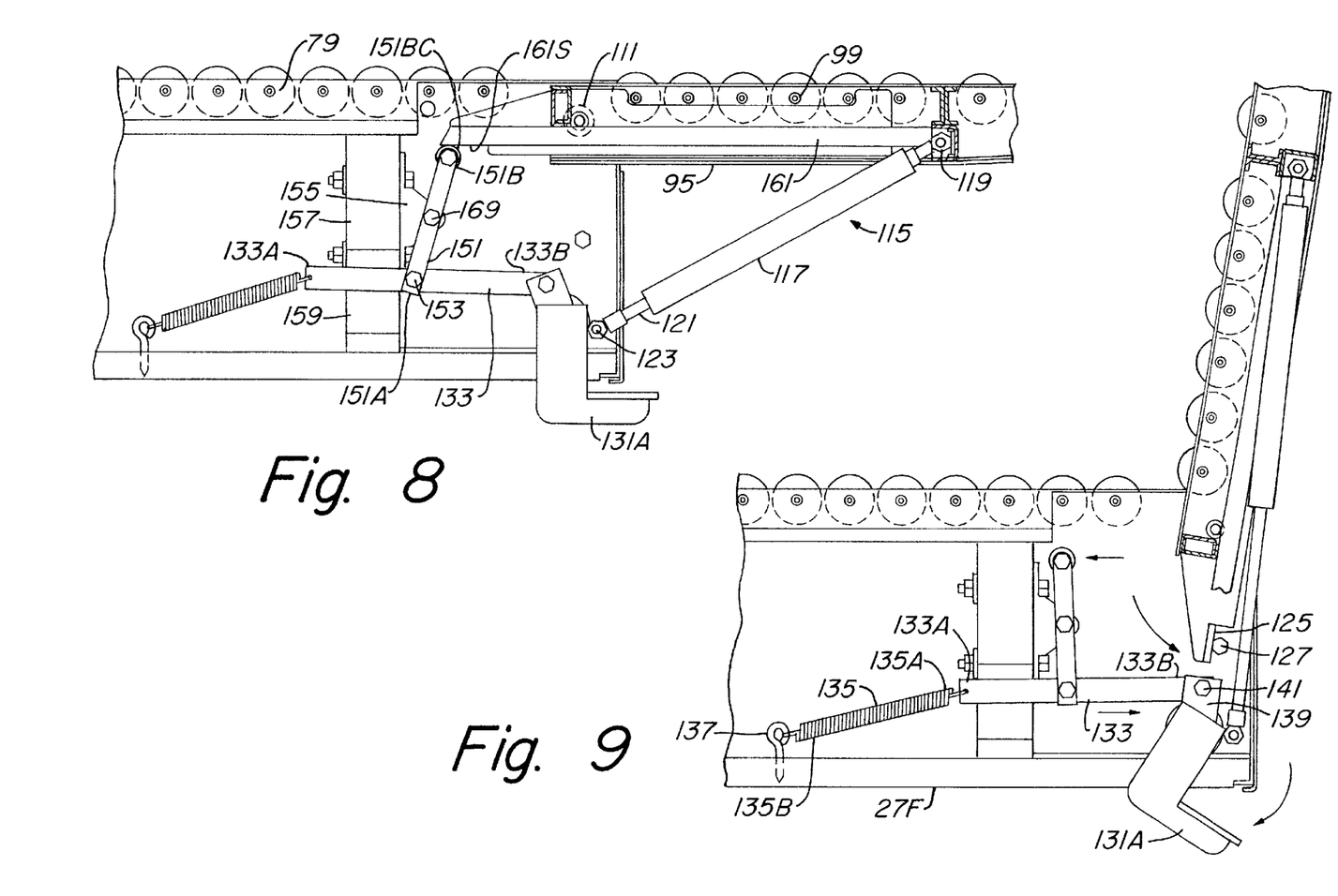
FIG. 8 is a side view of the bridge latching and biasing mechanism with the bridge latched in a lowered position.
FIG. 9 is a side view of the bridge latching and biasing mechanism with the bridge located in an upward extending position.
Figure 10:
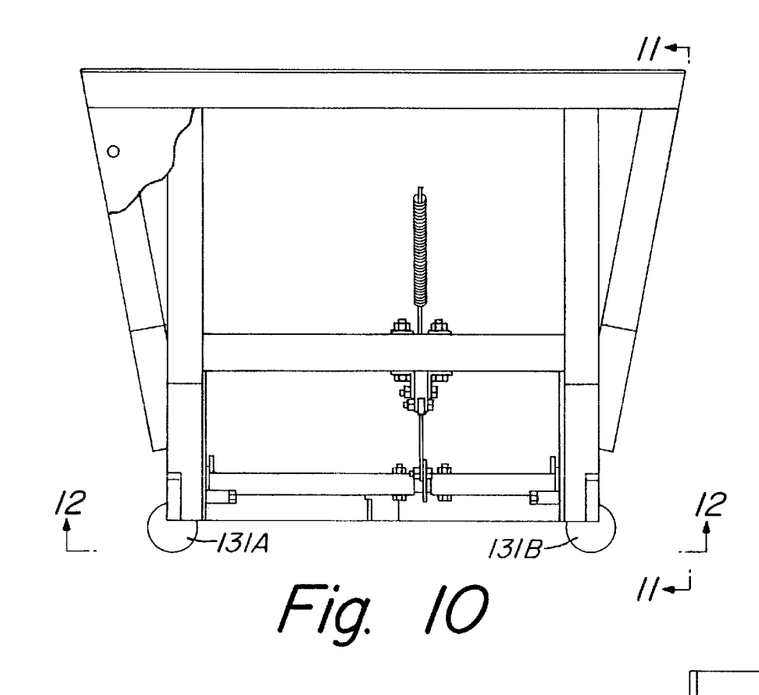
FIG. 10 is a top view of the bridge base with the bridge removed and the rollers removed.
Figure 11:
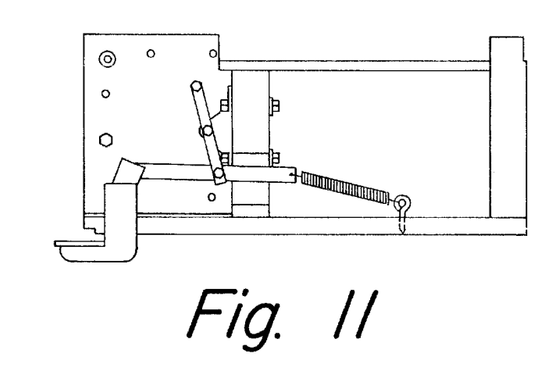
FIG. 11 is a side view of FIG. 10 as seen along lines 11—11 thereof.
Figure 12:
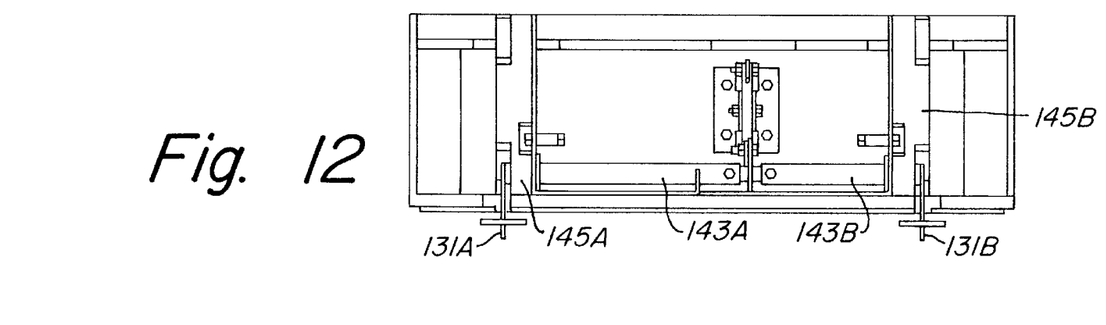
FIG. 12 is an end view of FIG. 10 as seen along lines 12—12 thereof.

The end 91 of the bridge 29 is pivotally coupled to the end 62 of the bridge base by rod 111 such that the bridge base 29 may pivot between an upright or upward extending position as shown in FIGS. 2 and 9 and a lower horizontal position as shown in FIGS. 1, 4, and 8. In the upward extending position, the bridge 29 is moved out from above the aisle 37 to allow personnel to walk freely on the aisle or pathway 37 behind the counters. In the lower horizontal position, the bridge end 92 and strip 103 are located next to and against the top edge structure 35 of the conveyor system 33 to allow baggage to be moved from the rollers of the apparatus onto the conveyor 37.

A biasing means comprising an air spring 115 is provided for normally urging the bridge 29 toward the upward extending position. The air spring includes a hollow cylinder 117 having one end pivotally coupled to the bridge 29 by a bolt 119 and a piston 121 extending from the other end. The other end of the piston 121 is pivotally coupled to the end 62 of the bridge base 27 by a bolt 123. Compressed air is located in the cylinder 117 which causes the piston and cylinder to move away from each other when the bridge 29 is in an unlatched position. Unlatching is carried out by pressing downward on a footplate 131A, 131B. Since the piston is coupled to the bridge base 27 which is stationary, the gas pressure causes the cylinder 115 to move away from the piston 117 when the bridge is in an unlatched condition, resulting in the bridge 29 being pivoted counter clockwise as seen in FIGS. 8 and 9 to an upright or upward extending position. The inner end of the bridge 29 has an engaging surface 125 which engages a bolt 127 or rod secured to the end 62 of the bridge base when the bridge 29 rotates counter clockwise, to a given position, as shown in FIGS. 8 and 9, to prevent further rotation of the bridge 29. Engagement of the surface 125 and bolt 127 prevent further movement of the bridge in an upward extending position.

When it is desired to lower the bridge 29 for movement of baggage onto the conveyor 37, the attendant merely pushes the bridge down to rotate it clockwise, as seen in FIG. 9 while foot plate 131A, 131B is pressed down until the end 92 rests against the upper side 35 of the conveyor system 33 and then releases the footplate 131A, 131B to latch the bridge 29 in the lowered horizontal position.

The latch and release system comprises a link 133 having one end 133A coupled to one end 135A of an elongated spring 135 which has its other end 135B secured by a hook 137 to the floor 27F of the bridge base 27. The other end 133B of the link 133 is pivotally coupled to a bell crank weldment 139 by a pin 141 which weldment is fixedly secured to a rod 143A, 143B supported for rotation by members 145A and 145B of the base 27. Foot plates 131A and 131B are fixedly coupled to the rod 143A, 143B such that pushing downward on either plate 131A or 131B will cause the rod 143A, 143B to rotate and hence the link 133 to be pulled to the right as seen in FIG. 9 against the force of the spring 135. The spring 135 normally holds the link 133 and hence the plates 131A, 131B in the positions shown in FIG. 8.

A latch arm 151 is provided and which has two opposite ends 151A and 151B. The end 151A is pivotally coupled to the link 133 between its ends 133A and 133B by a bolt 153. A bracket 155 is secured to a support 157 which is secured to the base 27. An aperture 159 extends through the support 157. The link 133 extends through the aperture 159. A bolt 169 pivotally couples the midpoint of the latch arm 151 to the bracket 157. The end 151B of the latch arm has a sleeve 151BC for engaging the lower surface 161S of a member 161 of the bridge 29 when the bridge is in its lowered position for latching the bridge in this position. The member 161 is fixedly secured to the bridge 29. In the position shown in FIG. 8, the latch arm 151, 151B, by engaging the member 161, prevents the spring 115 from moving the bridge to the upper position.

When it is desired to move the bridge 27 to its upper position, the operator will push down on one of the foot plates 131A or 131B which causes the link 133 to move to the right as seen in FIGS. 8 and 9. This causes the latch arm 151 to rotate counter clockwise as seen in FIGS. 8 and 9 to move the latch arm end 151B out from under the member 161 and its surface to allow the spring 115 to move the bridge 29 counter clockwise, as seen in FIGS. 8 and 9, about the pivot rod 111 and hence to the upper position.

When it is desired to move the bridge 29 downward to its lower position for loading baggage onto the conveyor belt, the operator rotates the bridge 29 downward about the pivot rod 111, and pushes one of the foot plates 131A, 131B down to allow the surface 161S of the member 161 to rotate above the end 151B of the latch arm 151. The operator then releases the foot plate which allows the spring 135 to pull the link 133 to the left as seen in FIGS. 8 and 9. This causes the latch arm 151 to rotate clockwise as seen in FIGS. 8 and 9 to position the end 151B of the arm under and in engagement with the surface 161S of the member 151 to latch the bridge 29 in its lower position.

Figure 13:
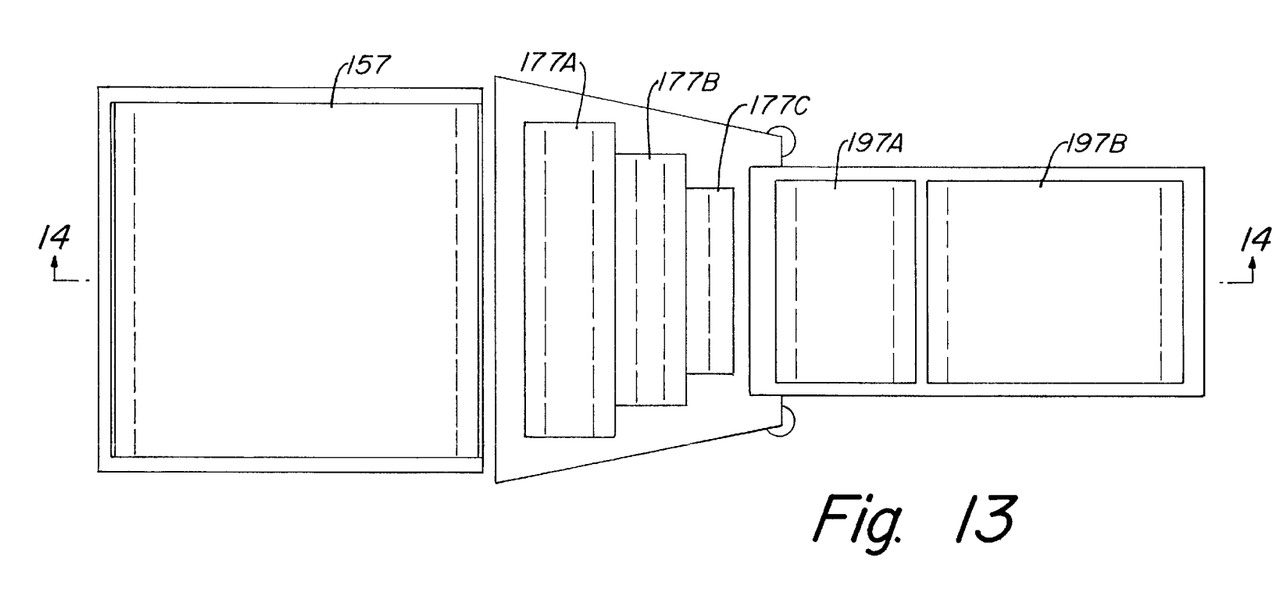
FIG. 13 is a top plan view of the apparatus with another type of conveyor system for handling baggage.
Figure 14:
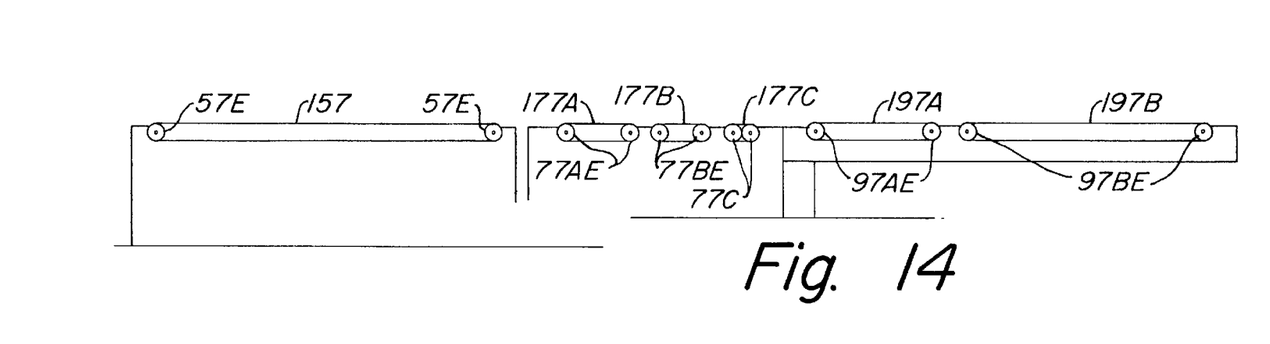
FIG. 14 is a cross section of the upper portion of FIG. 13 as seen along lines 14—14 thereof.
Figures 15, 17:
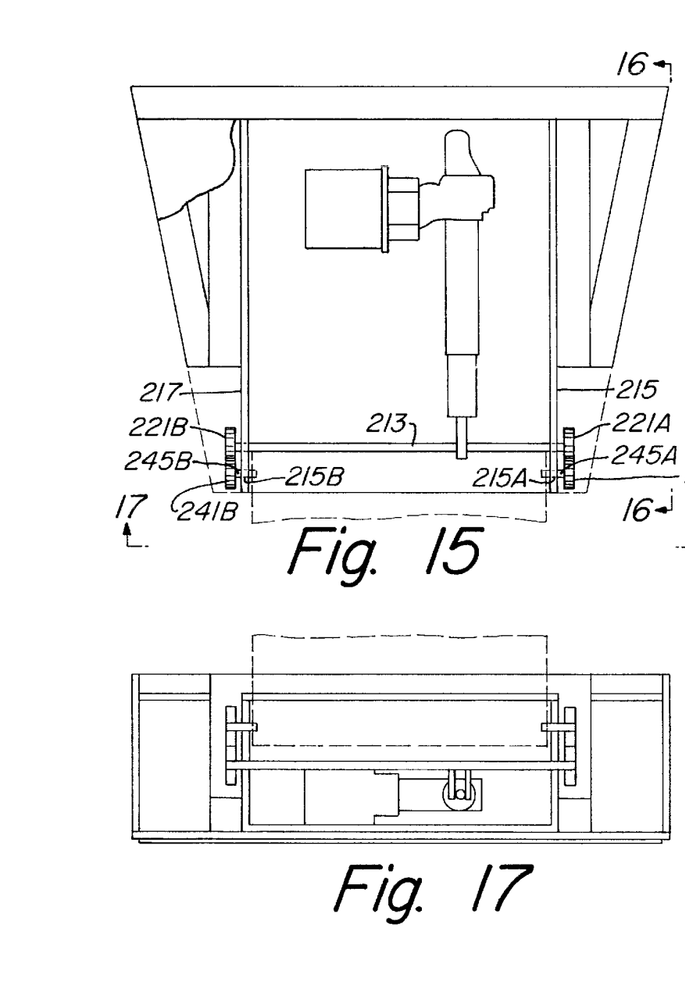
FIG. 15 is a top view of another type of apparatus for moving the bridge between its upward extending position and its lowered position.
FIG. 17 is a view of FIG. 15 as seen along lines 17—17 thereof.

Referring now to FIGS. 13 and 14 there will be described another type of conveyor system on the roller support 23, the bridge base 27 and the bridge 29. This system comprises endless belts 157, 177A, 177B, 177C, 197A and 197B. Belt 157 is supported by end rollers 57E. Belt 177A is supported by end rollers 77AE. Belt 177B is supported by end rollers 77BE. Belt 177C is supported by rollers 77C. Belt 197A is supported by end rollers 97AE and belt 197B is supported by end rollers 97BE. The rollers may rotate in either direction about their axes, however, for transporting bags from belt 157 to belt 197B and onto the conveyor 37 the rollers will rotate clockwise as seen in FIGS. 13 and 14 to allow the belts to rotate clockwise. Preferably the end rollers are unpowered and rotate freely however they may be powered by a mechanism to rotate clockwise as seen in FIGS. 13 and 14 to move bags on their belts from belt 157 to belt 197B and onto the conveyor 37.

Figure 16:
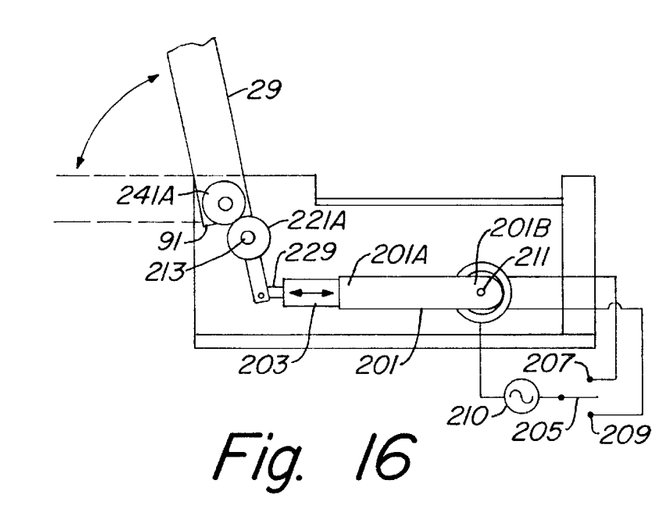
FIG. 16 is a view of FIG. 15 as seen along lines 16—16 thereof.
Figure 18:
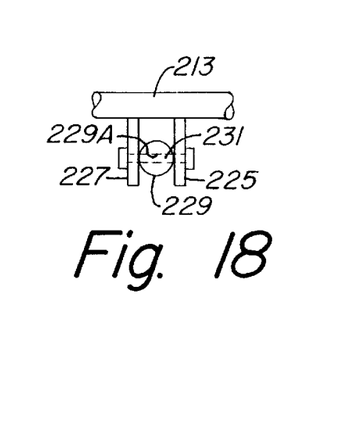
FIG. 18 is an enlarged view of a portion of the apparatus of FIG. 17.
Figure 19:
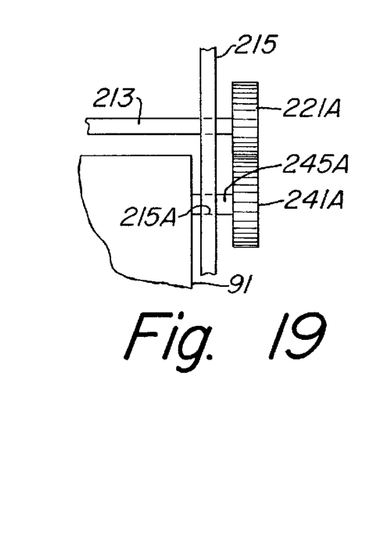
FIG. 19 is an enlarged view of a portion of the apparatus of FIG. 15.

Referring now to FIGS. 15–19 there is disclosed an electrically actuated linear actuator 201 comprising a piston 203 at one end 201A which can be moved in opposite directions by moving an electrical switch 205 to engage either contact 207 or 209. Member 210 represents AC power. The end 201B of the actuator 201 is supported for pivotal movement about a pivot means 211. A rod 213 is rotatably supported by walls 215 and 217. Fixedly coupled by opposite ends of the rod 213 are two gears 221A and 221B. A yoke comprising two spaced apart members 225 and 227 are fixedly coupled to the rod 213. The end of the piston 203 has a rod 229 fixedly coupled thereto with an aperture 299A formed therethrough. A rod 231 extends through the aperture 229A and is connected to the two members 225 and 227 such that when the piston 203 moves to the left as seen in FIG. 16 the gears 221A and 221B rotate clockwise and when the piston 203 moves to the right as seen in FIG. 16, the gears 221A and 221B rotate counter clockwise.

Two gears 241A and 241B are fixedly coupled to rods 245A and 245B which rotatably extend through apertures 215A and 215B formed through walls 215 and 217 and which are fixedly secured to opposite sides of the bridge 29 at its end 91.

The teeth of gears 241A and 241B mesh with the teeth of gears 221A and 221B, respectively. Thus as gears 221A and 221B are rotated clockwise by movement of the piston 203 as seen in FIG. 16, the gears 241A and 241B are rotated counter clockwise as seen in FIG. 16 to rotate the bridge 29 to its lowered position and as the gears 221A and 221B are rotated counter clockwise by movement of the piston 203, the gears 241A and 241B are rotated clockwise to move the bridge 29 to its upward extending position. Control of the gears 221A, 221B and hence of gears 241A, 241B is had by moving switch 205 to engage either contact 207 or 209.

What is claimed is:

1. An apparatus for use for moving items from above a scale to a conveyor means spaced from the scale, comprising:
   a support means having an upper side with support rotatable means coupled thereto,
   said support means being adapted to be supported by a scale whereby items may be located on said support rotatable means and weighed,
   a bridge base having a rear end and a forward end, said bridge base being adapted to be located between the scale and the conveyor means with said rear end located next to said support means,
   said bridge base having an upper side with bridge base rotatable means coupled thereto,
   a bridge having a first end and an opposite second end,
   said first end being pivotally coupled to said forward end of said bridge base such that said bridge may be pivoted between a first upward extending position and a second position wherein said bridge extends toward the conveyor means and said opposite second end is located next to the conveyor means,
   said bridge having an upper side with bridge rotatable means coupled thereto whereby when said bridge is in said second position, items may be located on said support rotatable means and then moved to the conveyor means by way of said support rotatable means, said bridge base rotatable means, and said bridge rotatable means.

2. The apparatus of claim 1, wherein said support rotatable means, said bridge base rotatable means, and said bridge rotatable means each comprises a plurality of rollers.

3. The apparatus of claim 1, wherein said support rotatable means, said bridge base rotatable means, and said bridge rotatable means each comprises an endless conveyor belt.

4. The apparatus of claim 1, comprising:
   latch means for latching said bridge in said second position when it is moved to said second position,
   release means for releasing said latch means to allow said bridge to be moved to said first upward extending position, and
   biasing means for moving said bridge to said first upward position when said latch means is released and for holding said bridge in said first upward extending position.

5. The apparatus of claim 4, wherein:
   said biasing means comprises a cylinder and piston coupled to said bridge base and said bridge.

6. The apparatus of claim 1, wherein:
   said bridge base rotatable means and said bridge rotatable means are located in about the same plane when said bridge is in said second position and in two different planes when said bridge is in said first upward extending position.

7. The apparatus of claim 1, wherein:
   said support means and said bridge base are unattached.

8. The apparatus of claims 5 wherein said latch means and said release means comprise:
   a release member pivotally coupled to said forward end of said bridge base for movement between a latch position and a release position,
   a link having a first end pivotally coupled to said release member and a second end extending toward said rear end,
   a latch arm having a lower end pivotally coupled to said link between said first and second ends of said link and an upper end,
   means pivotally coupled to said latch arm between said lower and upper ends and fixedly coupled to said bridge base for allowing said latch arm to move between a latch position and a release position,
   a spring having a forward end coupled to said second end of said link and a rear end coupled to said bridge base for normally urging said link in a rearward direction to normally urge said latch arm to a latch position and said release member to a latch position,
   engaging means coupled to said first end of said bridge,
   said first end of said bridge being pivotally coupled to said forward end of said bridge base by way of pivot means,
   said biasing means being coupled to said bridge forward of said pivot means for urging said bridge to said upward extending position and said engaging means against said upper end of said latch arm when said bridge is in said second position to prevent said bridge from moving to said upward extending position,
   said release member when moved to its said release position moves said link arm to its said release position to allow said bridge to be moved to said upward extending position,
   stop means coupled to said bridge base for preventing movement of said bridge beyond a given upward extending position.

9. The apparatus of claim 1, comprising:
   first gear means fixedly coupled to said first end of said bridge,
   second gear means for engaging said first gear means, and
   means for rotating said second gear means in a first direction for moving said bridge to said upward extending position and for rotating said second gear means in a second direction for moving said bridge to said second position.

10. The apparatus of claim 9, wherein:
    said support means and said bridge base are unattached.

11. An apparatus for use for moving items from above a scale to a conveyor means spaced from said scale, comprising:
- a support means having an upper side with support rotatable means coupled thereto,
- said support means being supported by said scale whereby items may be located on said support rotatable means and weighed,
- a bridge base having a rear end and a forward end,
- said bridge base being located between said scale and said conveyor means with said rear end located next to said support means,
- said bridge base having an upper side with bridge base rotatable means coupled thereto,
- a bridge having a first end and an opposite second end,
- said first end being pivotally coupled to said forward end of said bridge base such that said bridge may be pivoted between a first upward extending position and a second position wherein said bridge extends toward the conveyor means and said opposite second end is located next to said conveyor means,
- said bridge having an upper side with bridge rotatable means coupled thereto whereby when said bridge is in said second position, items may be located on said support rotatable means and then moved to said conveyor means by way of said support rotatable means, said bridge base rotatable means, and said bridge rotatable means.

12. The apparatus of claim 11, wherein said support rotatable means, said bridge base rotatable means, and said bridge rotatable means each comprises a plurality of rollers.

13. The apparatus of claim 11, wherein said support rotatable means, said bridge base rotatable means, and said bridge rotatable means each comprises an endless conveyor belt.

14. The apparatus of claim 11, comprising:
- latch means for latching said bridge in said second position when it is moved to said second position,
- release means for releasing said latch means to allow said bridge to be moved to said first upward extending position, and
- biasing means for moving said bridge to said first upward position when said latch means is released and for holding said bridge in said first upward extending position.

15. The apparatus of claim 14, wherein:
said biasing means comprises a cylinder and piston coupled to said bridge base and said bridge.

16. The apparatus of claim 11, wherein:
said bridge base rotatable means and said bridge rotatable means are located in about the same plane when said bridge is in said second position and in two different planes when said bridge is in said first upward extending position.

17. The apparatus of claim 11, wherein:
said support means and said bridge base are unattached.

18. The apparatus of claims 15 wherein said latch means and said release means comprises:
- a release member pivotally coupled to said forward end of said bridge base for movement between a latch position and a release position,
- a link having a first end pivotally coupled to said release member and a second end extending toward said rear end,
- a latch arm having a lower end pivotally coupled to said link between said first and second ends of said link and an upper end,
- means pivotally coupled to said latch arm between said lower and upper ends and fixedly coupled to said bridge base for allowing said latch arm to move between a latch position and a release position,
- a spring having a forward end coupled to said second end of said link and a rear end coupled to said bridge base for normally urging said link in a rearward direction to normally urge said latch arm to a latch position and said release member to a latch position,
- engaging means coupled to said first end of said bridge,
- said first end of said bridge being pivotally coupled to said forward end of said bridge base by way of pivot means,
- said biasing means being coupled to said bridge forward of said pivot means for urging said bridge to said upward extending position and said engaging means against said upper end of said latch arm when said bridge is in said second position to prevent said bridge from moving to said upward extending position,
- said release member when moved to its said release position moves said link arm to its said release position to allow said bridge to be moved to said upward extending position,
- stop means coupled to said bridge base for preventing movement of said bridge beyond a given upward extending position.

19. The apparatus of claim 11, comprising:
first gear means fixedly coupled to said first end of said bridge,
second gear means for engaging said first gear means, and
means for rotating said second gear means in a first direction for moving said bridge to said upward extending position and for rotating said second gear means in a second direction for moving said bridge to said second position.

20. The apparatus of claim 19, wherein:
said support means and said bridge base are unattached.

* * * * *